US012552702B2

(12) United States Patent
O'Brien et al.

(10) Patent No.: US 12,552,702 B2
(45) Date of Patent: Feb. 17, 2026

(54) SPINNERS

(71) Applicant: Owens Corning Intellectual Capital, LLC, Toledo, OH (US)

(72) Inventors: Evan O'Brien, New Albany, OH (US); Stephen Prichard, Columbus, OH (US)

(73) Assignee: Owens Corning Intellectual Capital, LLC, Toledo, OH (US)

( * ) Notice: Subject to any disclaimer, the term of this patent is extended or adjusted under 35 U.S.C. 154(b) by 273 days.

(21) Appl. No.: 18/305,732

(22) Filed: Apr. 24, 2023

(65) Prior Publication Data
US 2023/0339799 A1 Oct. 26, 2023

Related U.S. Application Data

(60) Provisional application No. 63/334,752, filed on Apr. 26, 2022.

(51) Int. Cl.
| | |
|---|---|
| *C03B 37/095* | (2006.01) |
| *B33Y 10/00* | (2015.01) |
| *B33Y 80/00* | (2015.01) |
| *C03B 37/08* | (2006.01) |
| *C22C 30/00* | (2006.01) |
| *B22F 10/28* | (2021.01) |

(52) U.S. Cl.
CPC ............ *C03B 37/095* (2013.01); *B33Y 80/00* (2014.12); *C03B 37/0805* (2013.01); *C22C 30/00* (2013.01); *B22F 10/28* (2021.01); *B22F 2301/15* (2013.01); *B22F 2301/20* (2013.01); *B33Y 10/00* (2014.12)

(58) Field of Classification Search
CPC . C03B 37/095; C03B 37/0805; C03B 37/047; B33Y 80/00; B33Y 10/00; B33Y 50/02; B33Y 70/00; C22C 30/00; B22F 10/28; B22F 2301/15; B22F 2301/20; B22F 5/10; B22F 10/36; B22F 2005/002; B22F 10/25

See application file for complete search history.

(56) References Cited

U.S. PATENT DOCUMENTS

| | | | |
|---|---|---|---|
| 4,904,290 | A | 2/1990 | Gaul et al. |
| 5,118,332 | A | 6/1992 | Hinze |

(Continued)

FOREIGN PATENT DOCUMENTS

| | | | |
|---|---|---|---|
| WO | WO-2021243406 A1 | * | 12/2021 |
| YU | 44240 B | | 4/1990 |

OTHER PUBLICATIONS

Zhao et al. Molten pool behavior and effect of fluid flow on solidification conditions in selective electron beam melting (SEBM) of a biomedical Co—Cr—Mo alloy, Additive Manufacturing 26 (2019) 202-214 (Year: 2019).*

(Continued)

*Primary Examiner* — Rebecca Janssen
(74) *Attorney, Agent, or Firm* — Calfee, Halter & Griswold LLP

(57) ABSTRACT

A spinner for use in manufacturing glass fibers includes a body having an upper wall with an opening therethrough, a lower wall, and a side wall extending between the upper wall and the lower wall. The side wall comprises a plurality of orifices, and the body comprises a metal alloy material and is formed using a localized welding method, such as a directed energy deposition (DED) method.

11 Claims, 5 Drawing Sheets

EQUIAXED REGIONS

FINE COLUMNAR DENDRITIC REGIONS

(56) References Cited

U.S. PATENT DOCUMENTS

| | | | |
|---|---|---|---|
| 5,286,446 A | 2/1994 | McGarry | |
| 5,582,841 A | 12/1996 | Watton et al. | |
| 5,743,157 A | 4/1998 | Hinze | |
| 5,846,284 A | 12/1998 | Hinze et al. | |
| 6,167,729 B1 | 1/2001 | Watton et al. | |
| 6,361,836 B1 | 3/2002 | Johnson | |
| 2003/0230119 A1 | 12/2003 | Coffey et al. | |
| 2023/0106938 A1* | 4/2023 | Hentrich | C22C 1/0433 |
| | | | 420/438 |

OTHER PUBLICATIONS

International Search Report and Written Opinion from PCT/US2023/019595 dated Jul. 18, 2023.

* cited by examiner

| (wt.%) | Alloy 1 | Alloy 2 | Gaul (US 4,904,290) | McGarry (US 5,286,446) |
|---|---|---|---|---|
| Chromium (Cr) | 35.0-36.0 | 35.0-36.0 | 33-40 | about 25.0 - about 40.0 |
| Cobalt (Co) | 30.0-36.0 | Balance | Balance | about 25.0 - 39.0 |
| Nickel (Ni) | 18.01-22.0 | 19.0-20.0 | 5.0-15 | 15.0 - about 25.0 |
| Tungsten (W) | 5.5-6.1 | 5.5-6.1 | 5.0-10 | about 0 - about 7.0 |
| Tantalum (Ta) | 2.2-2.8 | 0.20-2.80 | 1.5-4 | about 0 - about 5.0 |
| Carbon (C) | 0.70-0.78 | 0.70-0.78 | 0.75-1.3 | about 0.2 - about 1.2 |
| Hafnium (Hf) | 0.60-0.90 | 0.90 max | | 0 - about 1.0 |
| Zirconium (Zr) | 0.17-0.23 | 0.17-0.23 | 0.01-0.5 | about 0.1 - about 0.4 |
| Silicon (Si) | (>0) 0.13 max | 0.20 max | 0-0.2 (optional) | 0 - about 0.8 |
| Oxygen (O) | 0.10 max | 0.002-0.009 | ~50 PPM max as impurity | |
| Sulfur (S) | 0.01 max | 0.005 max | 0-0.005 (as impurity) | |
| Nitrogen (N) | 0.01 max | 0.015 max | ~150 PPM max as impurity | |
| Boron (B) | 0.008-0.012 | 0.008-0.012 | 0.005-0.5 | about 0.005 - about 0.04 |
| Aluminum (Al) | 0.0-0.2 | 0.20 max | 0-0.2 (as impurity) | 0.0 - about 0.2 |
| Titanium (Ti) | 0.0-0.2 | 0.20 max | 0-0.2 (as impurity) | 0.0 - about 0.2 |
| Manganese (Mn) | 0.0-0.01 | 0.02 max | 0-0.05 (as impurity) | 0.0 - about 0.05 |
| Molybdenum (Mo) | 0.0-0.1 | 0.14 max | 0-0.1 (as impurity) | 0.0 - about 0.1 |
| Iron (Fe) | 0.0-1.0 | 1.0 max | 0-2 (optional) | 0.0 - about 2.0 |
| Silver (Ag) | | 0.0005 max | 50 PPM max as impurity | |
| Bismuth (Bi) | | 0.00005 max | 0.5 PPM max as impurity | |
| Cerium (Ce) | | 0.05 max | | |
| Copper (Cu) | | 0.10 max | | |
| Phosphorous (P) | | 0.015 max | 0-0.005 (as impurity) | |
| Lead (Pb) | | 0.0005 max | 5 PPM max as impurity | |
| Selenium (Se) | | 0.0005 max | 5 PPM max as impurity | |
| Ta + Nb (Cb) | | 2.85-3.25 | | |

FIG. 2

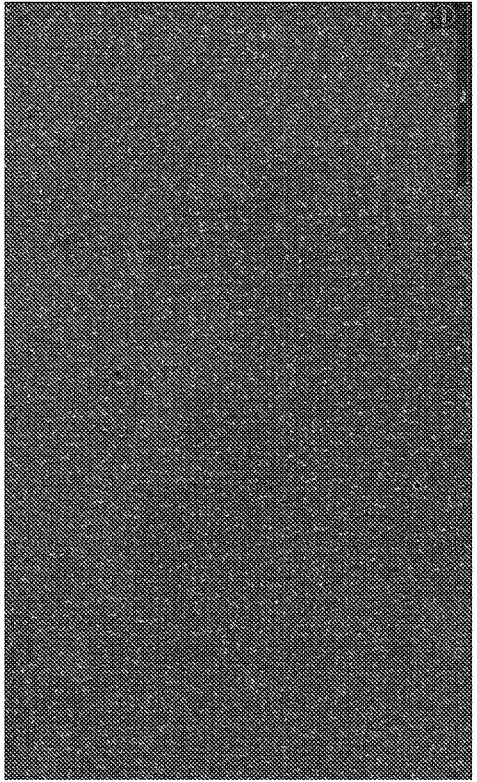
FIG. 3A
Printed Alloy 1
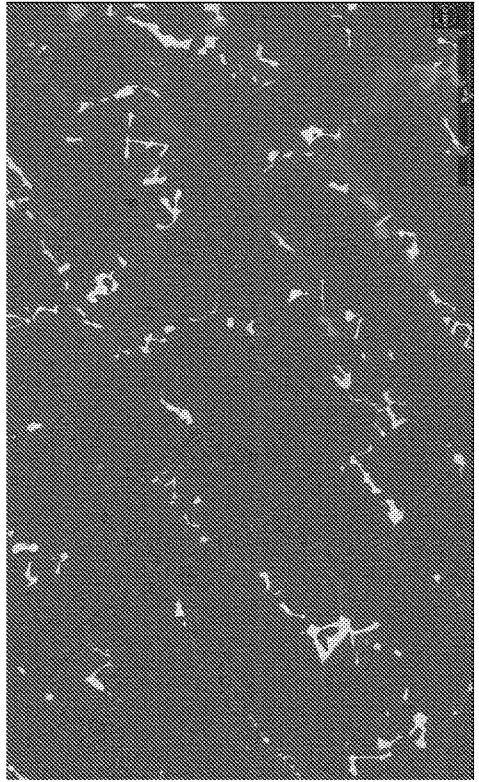
FIG. 3B
Printed Alloy 2
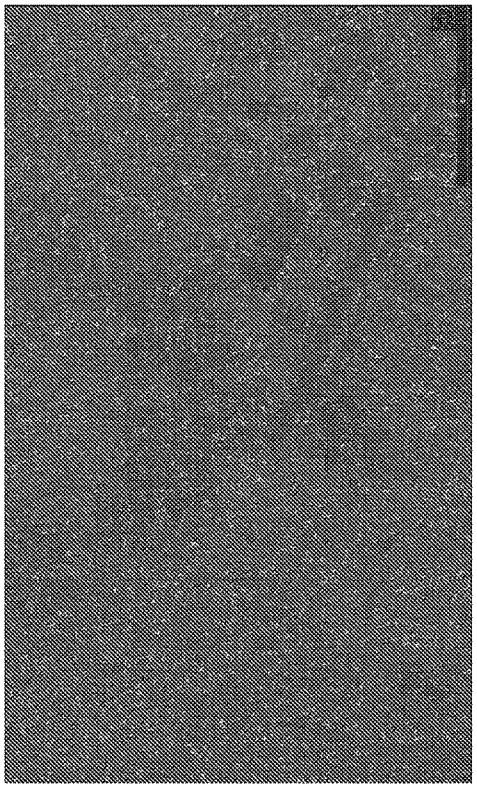
FIG. 3C - Cast Alloy 1
*PRIOR ART*
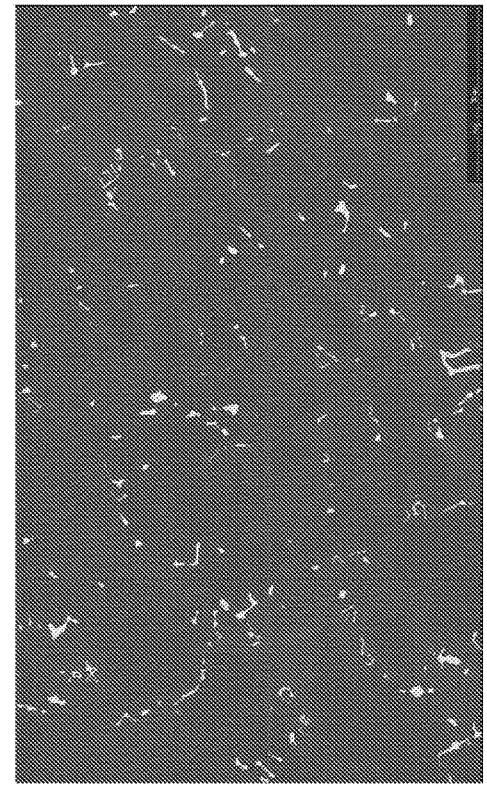
FIG. 3D - Cast Alloy 2
*PRIOR ART*

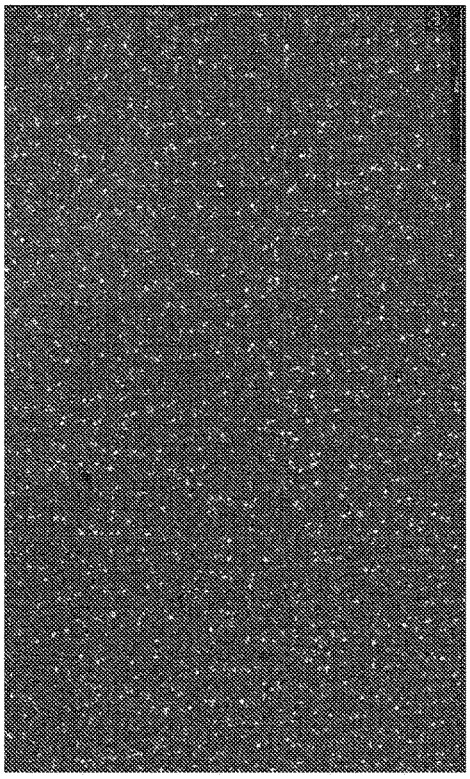
FIG. 4A
Printed Alloy 1
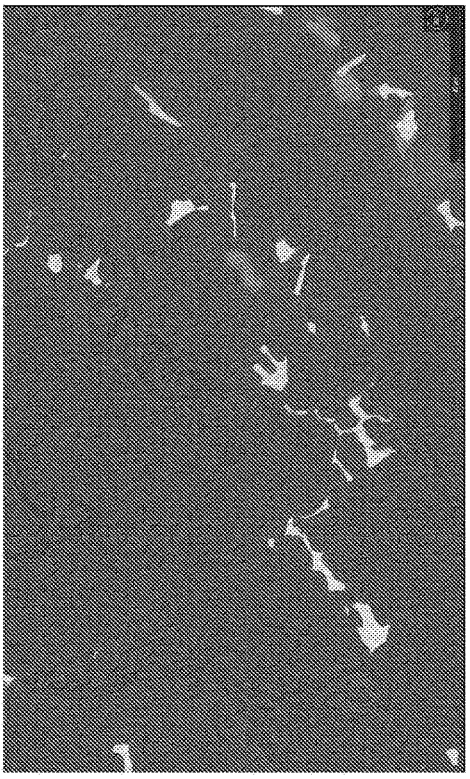
FIG. 4B
Printed Alloy 2
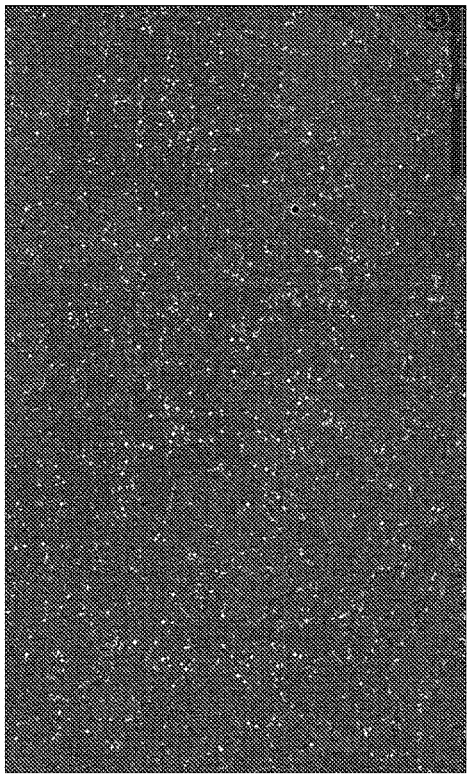
FIG. 4C - Cast Alloy 1
*PRIOR ART*
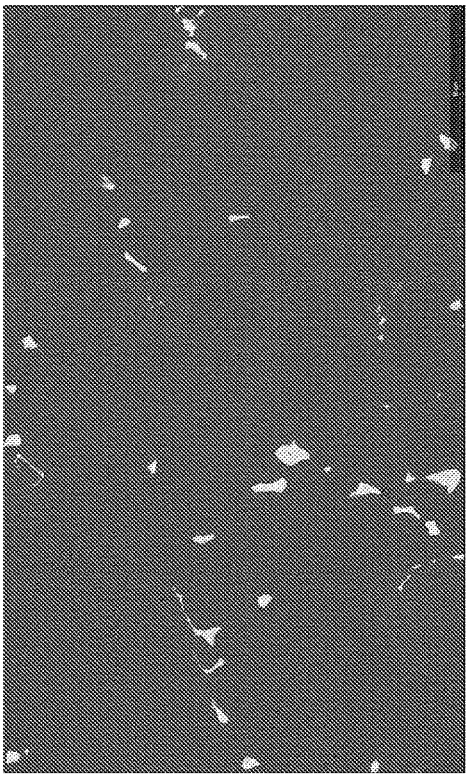
FIG. 4D - Cast Alloy 2
*PRIOR ART*

SPINNERS

CROSS-REFERENCE TO RELATED APPLICATION(S)

This application claims priority to and any benefit of U.S. Provisional Application No. 63/334,752, filed Apr. 26, 2022, the content of which is incorporated herein by reference in its entirety.

FIELD

The present disclosure relates to spinners for use in manufacturing glass fibers, and more particularly to improved materials and processes for making such spinners.

BACKGROUND

The statements in this section provide background information related to the present disclosure.

In the manufacture of glass fibers, a rotating spinner is used to direct molten glass through a plurality of orifices to form individual fibers. Such spinners are shown in greater detail, by way of example, in U.S. Pat. Nos. 4,904,290 and 5,286,446, each of which is incorporated herein by reference in its entirety.

Glass fiber spinners are typically made from a material that has high corrosion resistance, high creep resistance, and high oxidation resistance at elevated temperatures (e.g., 1,121° C. (approximately 2,050° F.)). These spinners are also typically manufactured using casting processes, in which the process is controlled in order to achieve the desired mechanical properties of the spinners. While cobalt-based alloys have been used in the past to meet the performance requirements of spinners, these alloys are relatively expensive.

The various challenges associated with materials and manufacturing of spinners for use in the production of glass fibers are addressed by the present disclosure.

SUMMARY

This section provides a general summary of the disclosure and is not a comprehensive disclosure of its full scope or all of its features.

In one form, a spinner for use in manufacturing glass fibers is provided that includes a body having an upper wall with an opening therethrough; a lower wall, which may or may not have an opening therethrough; and a side wall extending between the upper wall and the lower wall, the side wall comprising a plurality of orifices, wherein the body comprises a metal alloy material formed using a localized welding method. As used herein, the term localized welding method encompasses any suitable additive manufacturing process, such as directed energy deposition or powder bed fusion. See, e.g., ISO/ASTM 52900.

In one exemplary embodiment, the localized welding method may utilize an electron beam, a laser, or an electric or plasma arc.

In variations of this spinner, which may be implemented individually or in any combination: the localized welding method comprises laser directed energy deposition; the metal alloy is a chromium-cobalt-nickel alloy; the metal alloy comprises an anisotropic grain structure; the anisotropic grain structure comprises fine columnar dendritic regions with an average grain size, as measured across a width of the grain, between about 50 μm and about 200 μm; the anisotropic grain structure comprises refined equiaxed regions having an average grain size between about 20 μm and about 200 μm; the anisotropic grain structure comprises a concentration of carbides at grain/subgrain boundaries; an average intergrain distance between the concentration of carbides is between about 0.10 μm to about 4.0 μm; and an average size of the carbides is between about 0.5 μm to about 1.5 μm.

In one exemplary embodiment, the metal alloy material comprises chromium and at least one of nickel and cobalt.

In one exemplary embodiment, the metal alloy material comprises chromium, nickel, and cobalt.

In one exemplary embodiment, the metal alloy material comprises 25 wt. % to 40 wt. % of chromium.

In one exemplary embodiment, the metal alloy material comprises up to 75 wt. % of nickel, cobalt, or the combination thereof.

In one exemplary embodiment, the metal alloy material further comprises at least one of tungsten, boron, and carbon.

In one exemplary embodiment, the metal alloy material comprises 0.01 wt. % to 10.0 wt. % of tungsten.

In one exemplary embodiment, the metal alloy material comprises 0.002 wt. % to 0.05 wt. % of boron.

In one exemplary embodiment, the metal alloy material comprises 0.1 wt. % to 1.0 wt. % of carbon.

In one exemplary embodiment, the metal alloy material further comprises at least one of tantalum, zirconium, and hafnium.

In one exemplary embodiment, the metal alloy material comprises 0.01 wt. % to 5.0 wt. % of tantalum.

In one exemplary embodiment, the metal alloy material comprises 0.1 wt. % to 0.4 wt. % of zirconium.

In one exemplary embodiment, the metal alloy material comprises 0.01 wt. % to 1.0 wt. % of hafnium.

In one exemplary embodiment, the metal alloy material comprises: chromium in an amount between 25.0 wt. % and 40.0 wt. %; nickel in an amount between 15.0 wt. % and 25.0 wt. %; cobalt in an amount between 25.0 wt. % and 39.0 wt. %; tungsten in an amount between 0.01 wt. % and 10.0 wt. %; boron in an amount between 0.002 wt. % and 0.05 wt. %; carbon in an amount between 0.1 wt. % and 1.0 wt. %; tantalum in an amount between 0.01 wt. % and 5.0 wt. %; zirconium in an amount between 0.1 wt. % and 0.4 wt. %; and hafnium in an amount between 0.01 wt. % and 1.0 wt. %.

In one exemplary embodiment, the spinner has a total strain (in/in) that is at least 50% less than a total strain of an identical spinner made of the same metal alloy material by casting.

In one exemplary embodiment, the spinner comprises a minimum creep rate $(\times 10^{-4})$ (in/in/hr) that is at least 50% lower than a minimum creep rate of an identical spinner made of the same metal alloy material by casting.

In one exemplary embodiment, the spinner has a corrosion penetration depth (μm) that is at least 20% lower than a corrosion penetration depth of an identical spinner made of the same metal alloy material by casting.

In another form of the present disclosure, a process for manufacturing a component comprises depositing a metal alloy material onto a substrate; simultaneously applying a localized welding means to the metal alloy material as the metal alloy material is being deposited; and sequentially depositing and welding the metal alloy material into a plurality of layers to form the component, wherein the chromium-cobalt-nickel alloy material comprises: chromium in an amount between 25.0 wt. % and 40.0 wt. %; and up to 75 wt. % of nickel, cobalt, or a combination thereof.

In one exemplary embodiment of the process, the metal alloy material further comprises at least one of tungsten, boron, and carbon.

In one exemplary embodiment of the process, the metal alloy material comprises 0.01 wt. % to 10.0 wt. % of tungsten.

In one exemplary embodiment of the process, the metal alloy material comprises 0.002 wt. % to 0.05 wt. % of boron.

In one exemplary embodiment of the process, the metal alloy material comprises 0.1 wt. % to 1.0 wt. % of carbon.

In one exemplary embodiment of the process, the metal alloy material further comprises at least one of tantalum, zirconium, and hafnium.

In one exemplary embodiment of the process, the metal alloy material comprises 0.01 wt. % to 5.0 wt. % of tantalum.

In one exemplary embodiment of the process, the metal alloy material comprises 0.1 wt. % to 0.4 wt. % of zirconium.

In one exemplary embodiment of the process, the metal alloy material comprises 0.01 wt. % to 1.0 wt. % of hafnium.

In one exemplary embodiment of the process, the metal alloy material is in a powder form or a wire form.

In one exemplary embodiment of the process, the localized welding means is directed energy deposition or powder bed fusion.

In one exemplary embodiment of the process, the localized welding means comprises a heat source selected from the group consisting of a laser, an electron beam, and an electric or plasma arc.

In one exemplary embodiment of the process, at least one of a power and a travel speed of the heat source are controlled in order to control a solidification rate of the metal alloy material.

In one exemplary embodiment of the process, the component is a spinner for use in manufacturing glass fibers.

In one exemplary embodiment of the process, the spinner has a total strain (in/in) that is at least 50% less than a total strain of an identical spinner made of the same metal alloy material by casting.

In one exemplary embodiment of the process, the spinner has a minimum creep rate ($\times 10^{-4}$) (in/in/hr) that is at least 50% lower than a minimum creep rate of an identical spinner made of the same metal alloy material by casting.

In one exemplary embodiment of the process, the spinner has a corrosion penetration depth ($\mu m$) that is at least 20% lower than a corrosion penetration depth of an identical spinner made of the same metal alloy material by casting.

In one exemplary embodiment of the process, the spinner comprises a body having an upper wall with an opening therethrough, a lower wall, and a side wall extending between the upper wall and the lower wall, the side wall comprising a plurality of orifices.

In yet another form, a spinner is manufactured according to these processes. The spinner comprises a body having an upper wall with an opening therethrough; a lower wall, which may or may not have an opening therethrough; and a side wall extending between the upper wall and the lower wall, the side wall comprising a plurality of orifices.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which:

FIG. 2 is a table of inventive alloys and comparative alloys according to the teachings of the present disclosure;

FIG. 3A is an SEM (Scanning Electron Microscopy) image of the microstructure of one 3D printed alloy according to the teachings of the present disclosure;

FIG. 3B is an SEM image of the microstructure of another 3D printed alloy according to the teachings of the present disclosure;

FIG. 3C is an SEM image of the microstructure of one cast alloy of the prior art;

FIG. 3D is an SEM image of the microstructure of another cast alloy of the prior art;

FIG. 4A is an SEM image of the microstructure of the 3D printed alloy of FIG. 3A at a larger scale;

FIG. 4B is an SEM image of the microstructure of the 3D printed alloy of FIG. 3B at a larger scale;

FIG. 4C is an SEM image of the microstructure of the cast alloy of FIG. 3C at a larger scale;

FIG. 4D is an SEM image of the microstructure of the cast alloy of FIG. 3D at a larger scale;

Figure 1:
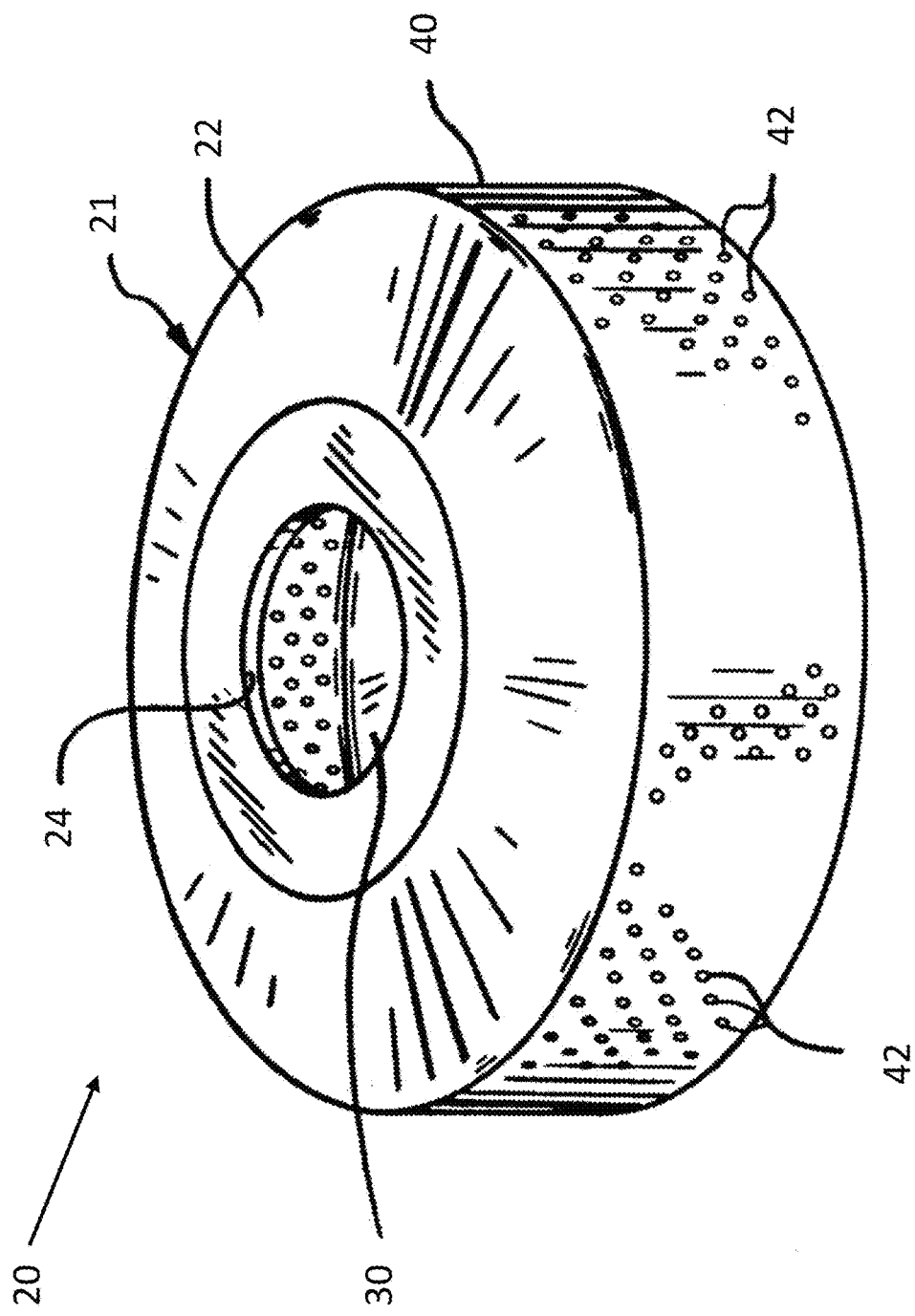
FIG. 1 is a spinner constructed in accordance with the teachings of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

The inventors have discovered unexpected and advantageous microstructures, mechanical properties, and corrosion properties for alloys formed using a localized welding method, such as a directed energy deposition method, and specifically in the application of spinners for use in the manufacture of glass fibers.

Generally, directed energy deposition (DED) (also referred to as "laser metal deposition" (LMD), "direct metal deposition" (DMD), or "laser direct energy deposition" (LDED)) is an additive process in which an energy source first heats the surface of a workpiece to create a weld pool. The energy source can include, for example, a laser, an electron beam, or an electric or plasma arc. Next, a metal powder is sprayed directly into the weld pool from a nozzle. The metal powder melts and combines with the base material of the workpiece to create a layer, and the process is repeated for multiple layers as the application requires. Further an inert shielding gas, such as Argon by way of example, is used during the deposition process to ensure a desired chemistry in the final product from the initial metal powder feed. It should also be understood that other forms of the metal may be employed, such as a wire by way of example, while remaining within the scope of the present disclosure.

According to the teachings of the present disclosure, a variety of alloys are used in combination with a localized welding method, such as directed energy deposition (DED), to create spinners having improved properties for the application of manufacturing glass fibers. However, it should be understood that the teachings herein could be applied in applications other than glass fiber spinners while remaining within the scope of the present disclosure.

Referring now to FIG. 1, an exemplary spinner for use in manufacturing glass fibers is illustrated and generally indicated by reference numeral 20. The spinner 20 comprises a body 21 having an upper wall 22 with an opening 24 therethrough, a lower wall 30 with an optional opening therethrough (not shown), and a side wall 40 extending between the upper wall 22 and the lower wall 30, the side wall 40 having a plurality of orifices 42. Further details of such a spinner are illustrated and described in greater detail in U.S. Pat. Nos. 4,904,290 and 5,286,446, each of which is incorporated herein by reference in its entirety.

Advantageously, the body 21 comprises a metal alloy material formed using a localized welding method, such as by way of example the directed energy deposition (DED) method, which results in a spinner 20 having improved properties, and most notably improved creep resistance and corrosion resistance as set forth in greater detail below.

Referring to FIG. 2, samples made from a number of different metal alloy materials were evaluated and contemplated, in which the samples were prepared using both the DED method (in this case, a laser directed energy deposition method) and conventional casting. In the DED method, the following parameters were used to generate the non-cast samples: (1) a laser power of 2 kW, (2) a laser wavelength of 1,030 nm, (3) a laser spot size of 4 mm, (4) a travel speed of 500 mm/min, (5) a powder flow rate of 11.5 g/min, and (6) a standoff distance of 12 mm.

To obtain creep properties, samples were machined into tensile specimens with 0.25" diameter reduced sections and 3-3.5" overall length. The samples were placed into creep-rupture testing until failure with all samples tested at the standard conditions of 4,000 psi and 1,150° C. The total strain and minimum creep rate were recorded during the tests.

To obtain corrosion properties, samples were machined into 0.25"×0.25"×1.5" coupons. These coupons underwent corrosion testing by suspending them in molten glass for 100 hours at 1,050° C. Cross sections of these samples were evaluated with microscopy to measure the depth of corrosion at many areas along the surface to obtain an average. It should be understood that these alloys are merely exemplary and that a variety of alloys could be employed according to the teachings of the present disclosure.

The creep and corrosion properties of metal alloy materials made from the DED method were much improved when compared to the creep and corrosion properties of the same chromium-cobalt-nickel alloys made from conventional casting. Creep-rupture testing and corrosion testing data are shown below in Tables 1-3 for samples made from certain metal alloy materials:

TABLE 1

Material Creep Properties -DED Method

| Alloy | Total Strain (in/in) | Min Creep Rate ($\times 10^{-4}$) (in/in/hr) |
|---|---|---|
| Printed Alloy 1 | 0.027 | 0.31 |
| Printed Alloy 2 | 0.026 | 2.4 |

TABLE 2

Material Creep Properties - Cast Method

| Alloy | Total Strain (in/in) | Min Creep Rate ($\times 10^{-4}$) (in/in/hr) |
|---|---|---|
| Cast Alloy 1 Vendor 1 | 0.074 | 0.8 |
| Cast Alloy 2 Vendor 1 | 0.360 | 42.7 |
| Cast Alloy 2 Vendor 2 | 0.168 | 17.6 |
| Cast Alloy 2 Vendor 3 | 0.109 | 16.9 |

TABLE 3

Material Corrosion Properties -DED and Cast Methods

| Alloy | Average Corrosion Penetration Depth (μm) |
|---|---|
| Printed Alloy 1 | 21.2 |
| Printed Alloy 2 | 21.4 |
| Cast Alloy 1 Vendor 1 | 32.9 |
| Cast Alloy 2 Vendor 1 | 36.8 |

Overall, in preliminary testing, the samples made from the DED method demonstrated lower total strain, lower minimum creep rate, and less corrosion penetration. Thus, the samples made from the DED method showed an overall improvement in creep properties and corrosion resistance. Additionally, the Alloy 1 composition showed an overall improvement in creep properties compared to the Alloy 2 composition irrespective of processing method.

Figure 5B:
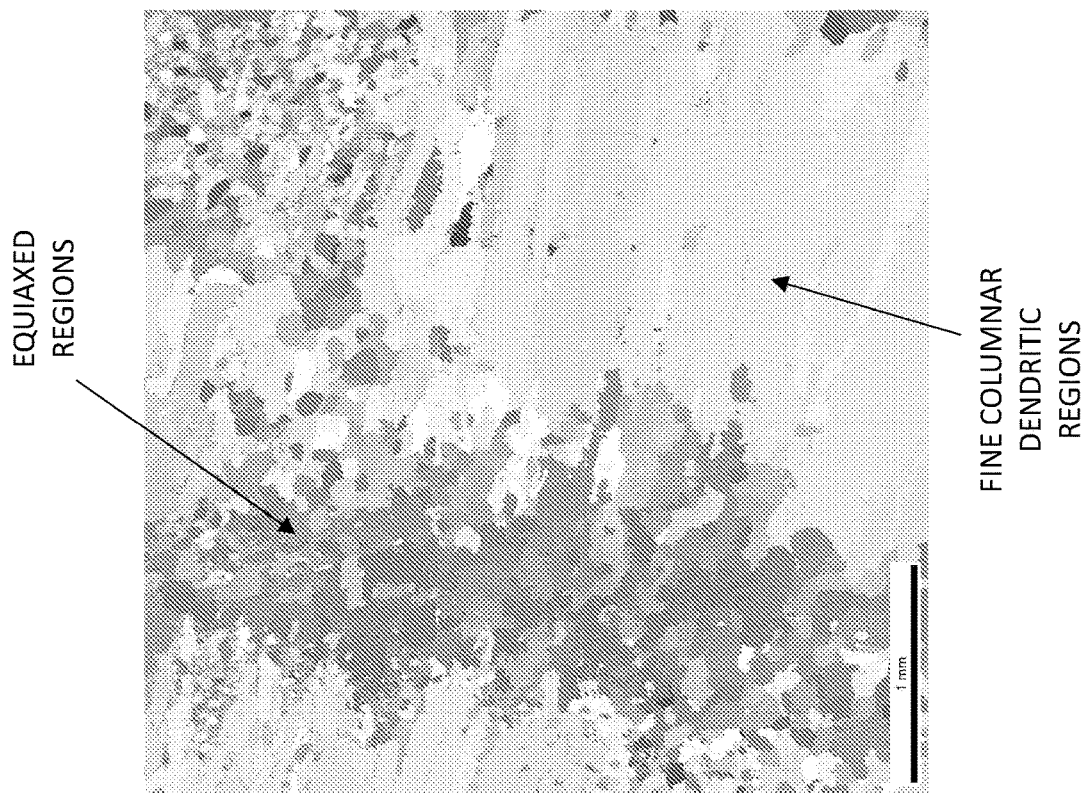
FIG. 5B is an enlarged view of FIG. 5A illustrating a microstructure with distinct equiaxed regions and fine columnar dendritic regions according to the present disclosure.
Figure 5A:
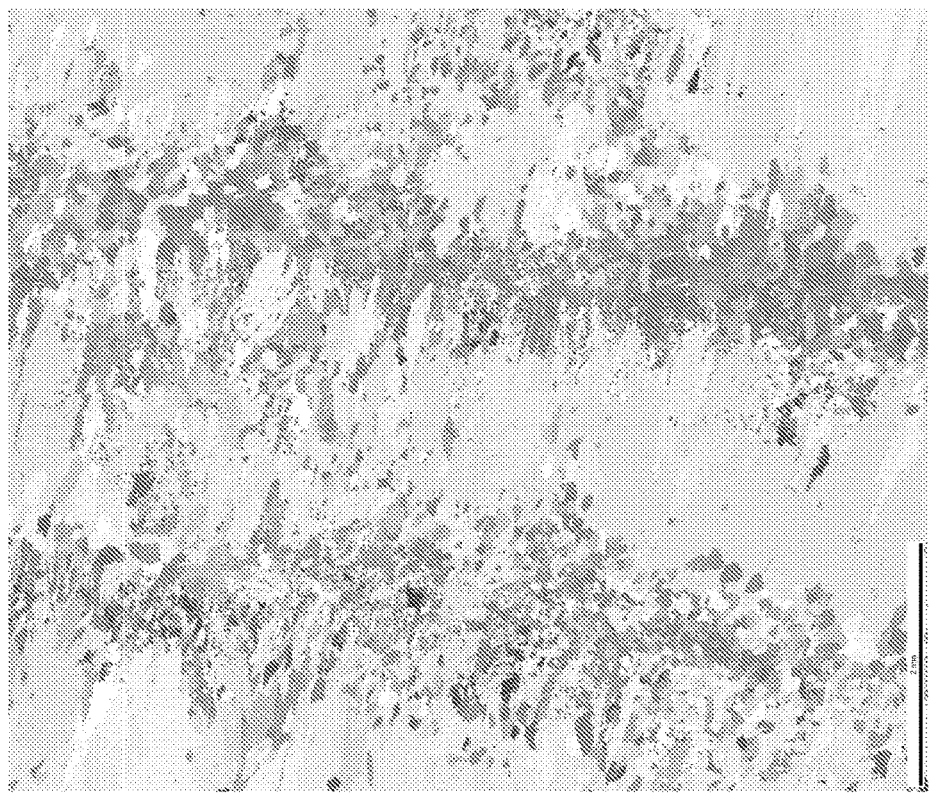
FIG. 5A is an IPF (Inverse Pole Figure) map of the microstructure of a 3D printed alloy obtained using EBSD (Electron Backscatter Diffraction) according to the teachings of the present disclosure.

Referring now to FIGS. 3A-3D, 4A-4D, and 5A-5B, the microstructure of the DED/3D Printed alloys is shown in comparison to the microstructure of a cast alloy. As shown, DED alloy comprises an anisotropic grain structure as best shown in FIGS. 5A and 5B. In one form, the anisotropic grain structure defines fine columnar dendritic regions with an average grain size (as measured across the width of the grain) between about 50 μm and about 200 μm. In another form, the anisotropic grain structure defines more refined equiaxed regions, wherein the average grain size was observed to be between about 20 μm and about 200 μm, when measured along the grains. In comparison, the cast alloy sample has an average grain size of about 600 μm. Accordingly, the improved creep properties are unexpected because in general with metal alloys, larger grain sizes result in improved creep properties. Here, with DED, the exact opposite was observed in preliminary testing.

The anisotropic grain structure comprises a concentration of carbides at grain/subgrain boundaries and the carbides are more evenly distributed. The average size of the carbides is about 0.5 μm to about 1.5 μm. The average intergrain distance between the carbides is between about 0.10 μm to about 4.0 μm. It is believed that this distribution of carbides and the resulting microstructure contributes to inhibiting grain boundary slip, thus resulting in improved mechanical properties. Additionally, the resulting microstructure is believed to improve corrosion resistance by providing a more uniform distribution of alloying elements.

In some embodiments, the metal alloy comprises chromium and at least one of nickel and cobalt. In some embodiments, the metal alloy may also include one or more of tungsten, boron, and carbon. In some embodiments, the metal alloy may also include one or more of tantalum, zirconium, and hafnium. General embodiments of metal alloys encompassed by the present disclosure include alloying elements, shown in wt. %, as set forth below in Table 4:

TABLE 4

General Metal Alloy Compositions

| Element | Range (wt. %) | Group |
|---|---|---|
| Chromium (Cr) | 25.0-40.0 | A |
| Nickel (Ni) | 0.0-75.0 | B |
| Cobalt (Co) | 0.0-75.0 | B |
| Tungsten (W) | 0.01-10.0 | C |
| Boron (B) | 0.002-0.05 | C |
| Carbon (C) | 0.1-1.0 | C |
| Tantalum (Ta) | 0.01-5.0 | D |
| Zirconium (Zr) | 0.1-0.4 | D |
| Hafnium (Hf) | 0.01-1.0 | D |

The alloying elements, alone and/or in combination, contribute to the production of suitable alloys. For example, carbon supports the formation of carbides, tantalum and hafnium act as carbide formers, tungsten acts as a carbide refiner, and boron and zirconium act as carbide stabilizers.

In some embodiments, the metal alloy includes at least one element from each of Group A, B, C, and D.

In some embodiments, the metal alloy includes chromium and at least one element from Group B. In some embodiments, the metal alloy includes chromium and all of the elements from Group B. In some embodiments, when the metal alloy includes both nickel and cobalt, the combined nickel and cobalt content is in the range of 0.1 to 75.0 wt. %.

In some embodiments, the metal alloy includes chromium, at least one element from Group B, and at least one element from Group C. In some embodiments, the metal alloy includes chromium, at least one element from Group B, and all of the elements from Group C.

In some embodiments, the metal alloy includes chromium, at least one element from Group B, at least one element from Group C, and at least one element from Group D. In some embodiments, the metal alloy includes chromium, at least one element from Group B, at least one element from Group C, and all of the elements from Group D.

In some embodiments, the metal alloy includes all of the elements from each of Group A, B, C, and D.

Some representative exemplary embodiments of chromium-cobalt-nickel alloys contemplated by the present disclosure include alloying elements, shown in wt. %, as set forth below in Table 5:

TABLE 5

Exemplary Chromium-Cobalt-Nickel Alloy Compositions

| Element | Range 1 (wt. %) | Range 2 (wt. %) | Target Value (wt. %) |
|---|---|---|---|
| Chromium (Cr) | 25.0-40.0 | 35.0-36.0 | 35.5 |
| Nickel (Ni) | 15.0-25.0 | 18.1-22.0 | 20.0 |
| Cobalt (Co) | 25.0-39.0 | 30.0-36.0 | 35.0 |

TABLE 5-continued

Exemplary Chromium-Cobalt-Nickel Alloy Compositions

| Element | Range 1 (wt. %) | Range 2 (wt. %) | Target Value (wt. %) |
|---|---|---|---|
| Tungsten (W) | 0.01-10.0 | 5.5-6.1 | 5.8 |
| Boron (B) | 0.002-0.05 | 0.008-0.012 | 0.01 |
| Carbon (C) | 0.1-1.0 | 0.7-0.78 | 0.74 |
| Tantalum (Ta) | 0.01-5.0 | 2.2-2.8 | 2.5 |
| Zirconium (Zr) | 0.1-0.4 | 0.17-0.23 | 0.20 |
| Hafnium (Hf) | 0.01 to 1.0 | 0.6-0.9 | 0.7 |

It should be understood that unintentional alloying elements (e.g., those falling outside of Groups A, B, C, and D) may be present in the final alloy, such as by way of example, Si, Al, Ti, Mn, and Mo (as shown in FIG. 2). Further, the element ranges disclosed herein include all incremental values between the minimum alloying element composition and maximum alloying element composition values. That is, a minimum alloying element composition value can range from the minimum value to the maximum value. Likewise, the maximum alloying element composition value can range from the maximum value shown to the minimum value disclosed.

As shown above, carbon is present in the alloy according to the present disclosure. While carbon in these amounts has been considered to be relatively high and can contribute to cracking in various welding applications, the inventors have discovered that this amount of carbon, when combined with a localized welding method, delivers unexpected results in terms of crack resistance of the spinner 20. It is believed that the solidification rate of the alloy with DED is relatively slow with a large melt pool when compared with other additive methods such as powder bed fusion. By controlling the power of the heat source (e.g., laser) and the travel speed of the heat source (e.g., laser), the solidification rate of the alloy can be controlled, or slowed significantly, such that the carbon content does not cause cracking of the spinner 20, as would normally be expected. Therefore, higher amounts of carbon can be used in the alloy according to the teachings herein when using the DED method, while maintaining sufficient mechanical properties for the application of a spinner 20 as described herein.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, material, manufacturing, and assembly tolerances, and testing capability.

As used herein, the phrase at least one of "a", "b", and "c" should be construed to mean a logical ("a" OR "b" OR "c"), using a non-exclusive logical OR, and should not be construed to mean at least one of "a", at least one of "b", and at least one of "c".

As used herein, the phrase between "a" and "b" and the phrase between "a" to "b", each encompasses the actual values of "a" and "b", as well as any values therebetween.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A process for manufacturing a component, the process comprising:
    depositing a metal alloy material onto a substrate;
    simultaneously applying a localized welding means to the metal alloy material as the metal alloy material is being deposited; and
    sequentially depositing and welding the metal alloy material into a plurality of layers to form the component,
    wherein the metal alloy material comprises:
        chromium in an amount between 25.0 wt. % and 40.0 wt. %; and
        up to 75 wt. % of nickel, cobalt, or a combination thereof,
    wherein the component is a spinner for use in manufacturing glass fibers, and
    wherein the localized welding means is directed energy deposition.

2. The process according to claim 1, wherein the metal alloy material further comprises at least one of tungsten, boron, and carbon.

3. The process according to claim 2, wherein the metal alloy material further comprises at least one of tantalum, zirconium, and hafnium.

4. The process according to claim 1, wherein at least one of a power and a travel speed of a heat source are controlled in order to control a solidification rate of the metal alloy material.

5. The process according to claim 1, wherein the spinner has a total strain (in/in) that is at least 50% less than a total strain of a spinner made of the same metal alloy material by casting.

6. The process according to claim 1, wherein the spinner has a minimum creep rate ($\times 10^{-4}$) (in/in/hr) that is at least 50% lower than a minimum creep rate of an identical a spinner made of the same metal alloy material by casting.

7. The process according to claim 1, wherein the spinner has a corrosion penetration depth ($\mu m$) that is at least 20% lower than a corrosion penetration depth of a spinner made of the same metal alloy material by casting.

8. The process according to claim 1, wherein the spinner comprises a body having an upper wall with an opening therethrough, a lower wall, and a side wall extending between the upper wall and the lower wall, the side wall comprising a plurality of orifices.

9. The process according to claim 1, wherein the metal alloy material comprises:
    chromium in an amount between 25.0 wt. % and 40.0 wt. %;
    nickel in an amount between 15.0 wt. % and 25.0 wt. %;
    cobalt in an amount between 25.0 wt. % and 39.0 wt. %;
    tungsten in an amount between 0.01 wt. % and 10.0 wt. %;
    boron in an amount between 0.002 wt. % and 0.05 wt. %;
    carbon in an amount between 0.1 wt. % and 1.0 wt. %;
    tantalum in an amount between 0.01 wt. % and 5.0 wt. %;
    zirconium in an amount between 0.1 wt. % and 0.4 wt. %; and
    hafnium in an amount between 0.01 wt. % and 1.0 wt. %.

10. The process according to claim 1, wherein the metal alloy material exhibits an anisotropic grain structure in the spinner having columnar dendritic regions with an average grain size between about 50 μm and about 200 μm when measured across the width of the grain.

11. The process according to claim 1, wherein the metal alloy material exhibits an anisotropic grain structure in the spinner having columnar dendritic regions with an average grain size between about 20 μm and about 200 μm when measured along the grain.

* * * * *